United States Patent [19]
Dedoes

[11] 3,756,203
[45] Sept. 4, 1973

[54] IMPLEMENT AND HITCH THEREFOR

[76] Inventor: Arnold A. Dedoes, 2070 W. Eleven Mile Rd., Berkley, Mich. 48072

[22] Filed: Feb. 22, 1972

[21] Appl. No.: 228,008

Related U.S. Application Data

[63] Continuation-in-part of Ser. No. 795,853, Feb. 3, 1967, Pat. No. 3,650,332, and a continuation-in-part of Ser. No. 2,582, Jan. 13, 1970, Pat. No. 2,643,746, and a continuation-in-part of Ser. No. 21,905, March 23, 1970, Pat. No. 3,650,331.

[52] U.S. Cl................. 172/464, 172/668, 172/680, 280/490, 296/52
[51] Int. Cl........................................... A01b 63/00
[58] Field of Search.................. 172/668, 605, 326, 172/491, 439, 448, 675, 680, 744, 464; 280/490, 405, 406, 456, 460, 461, 478, 479; 296/52, 51

[56] References Cited
UNITED STATES PATENTS

| | | | |
|---|---|---|---|
| 3,297,096 | 1/1967 | Wooldridge | 172/464 |
| 3,049,822 | 8/1962 | McMullen | 172/668 |
| 3,361,476 | 1/1968 | Smock | 296/51 X |
| 783,172 | 2/1905 | Bolton | 296/52 |

*Primary Examiner*—Robert E. Pulfrey
*Assistant Examiner*—Stephen C. Pellegrino
*Attorney*—Robert C. Hauke et al.

[57] ABSTRACT

A draw bar and hitch connection for coupling a plurality of substantially identical ground working implements to a utility vehicle and including means for transferring a portion of the weight of the vehicle to the implement.

3 Claims, 4 Drawing Figures

IMPLEMENT AND HITCH THEREFOR

REFERENCE TO RELATED APPLICATIONS

The present application is a continuation-in-part application of my copending U. S. Pat. applications Ser. No. 795,853 filed Feb. 3, 1967, now U.S. Pat. No. 3,650,332 Ser. No. 2,582 filed Jan. 13, 1970 now U.S. Pat. No. 2,643,746 and Ser. No. 21,905 filed Mar. 23, 1970 now U.S. Pat. No. 3,650,331.

BACKGROUND OF THE INVENTION

1. Field of the Invention

The present invention relates to ground working implements and more particularly to a means for mounting such implements to a utility vehicle or the like and including means to transfer a portion of the weight of the utility vehicle to the implement.

2. Description of the Prior Art

The aforementioned patents disclose a hitch assembly for tractors which has means for converting the upward motion of a power lift mechanism to a downward force exerted upon the implements attached to the tractor. In this way rather lightweight ground working implements can be used to perform work that heretofore required quite heavy and cumbersome implements. Because they do not need to be heavy, such implements can be constructed of less expensive materials so that the cost of providing implements of this type is greatly reduced.

Implements constructed in accordance with the teachings of my previous disclosures however require a tractor with a power lift mechanism to pull the implement. Without such power lift apparatus to transfer a portion of the weight of the tractor to the implement, the implements are too light to effectively perform the task they are designed to perform. The implements are designed for use on golf courses, cemeteries and the like which usually have tractors available of the necessary type. Such tractors, however, are quite expensive and for that reason are not always used, and if means could be provided to permit the use of such implements by smaller utility carts or other vehicles which do not have power lift apparatus, the implements would enjoy much more widespread use.

SUMMARY OF THE PRESENT INVENTION

The present invention, which will be described subsequently in greater detail, includes means for mounting an implement to the rear of a small utility vehicle or the like. The mounting means includes a self-contained hydraulic unit for transferring a portion of the weight of the vehicle to the implement.

DESCRIPTION OF THE DRAWINGS

The following detailed description refers to the accompanying drawings wherein like reference numerals refer to like parts throughout the several views, and in which.

DESCRIPTION OF A PREFERRED EMBODIMENT

Figures 1, 2:
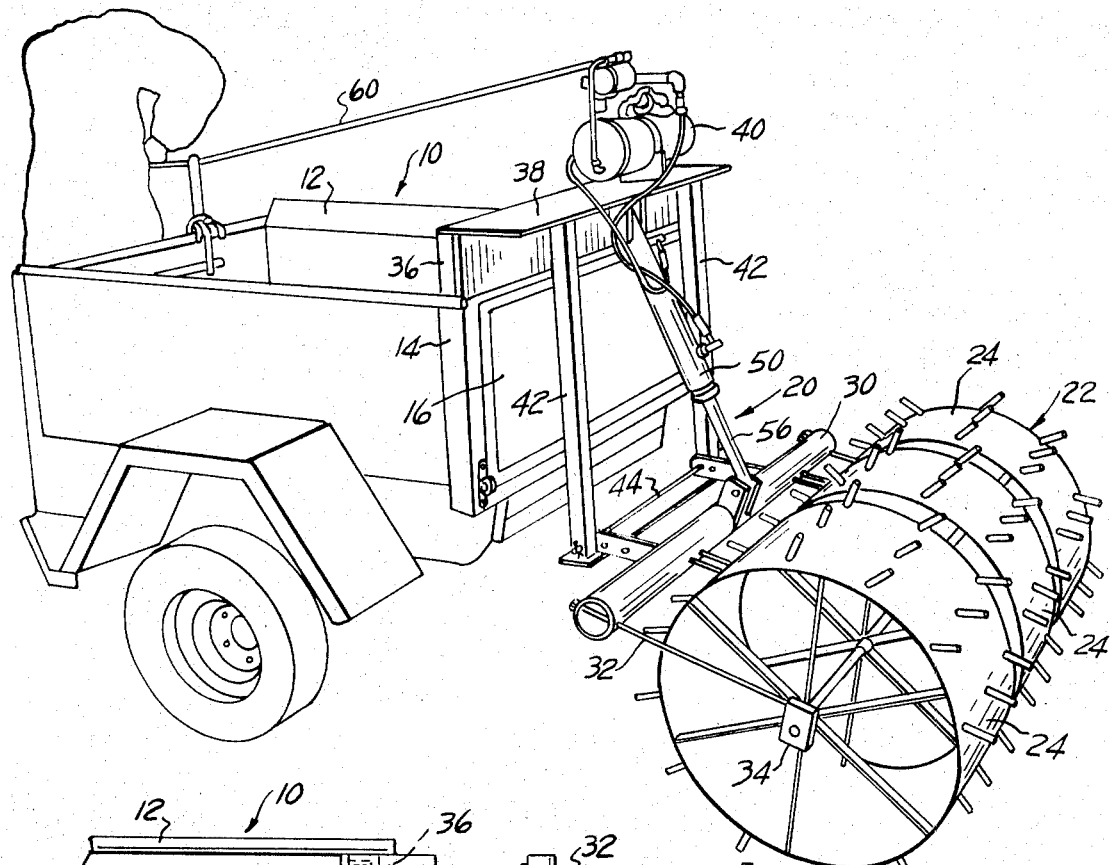
FIG. 1 is a perspective view illustrating the hitch assembly of the present invention coupling an implement to a utility vehicle.
FIG. 2 is a top plan view of a portion of the structure shown in FIG. 1.

Referring now to the drawings and more particularly FIG. 1 there is illustrated a towing vehicle such as a utility cart 10 or the like. The cart 10 is illustrated as being of the type commonly used around golf courses, cemeteries and the like and includes a bed 12 for carrying equipment, etc. As is common with such utility vehicles 10, upstanding hollow support members 14 are provided at the rear corner edges of the bed 12 to permit the height of the sides of the bed to be increased by receiving upstanding supports (not shown) and to also accommodate the latching mechanism and hinges for a downwardly swingable tail gate 16.

Figure 3:
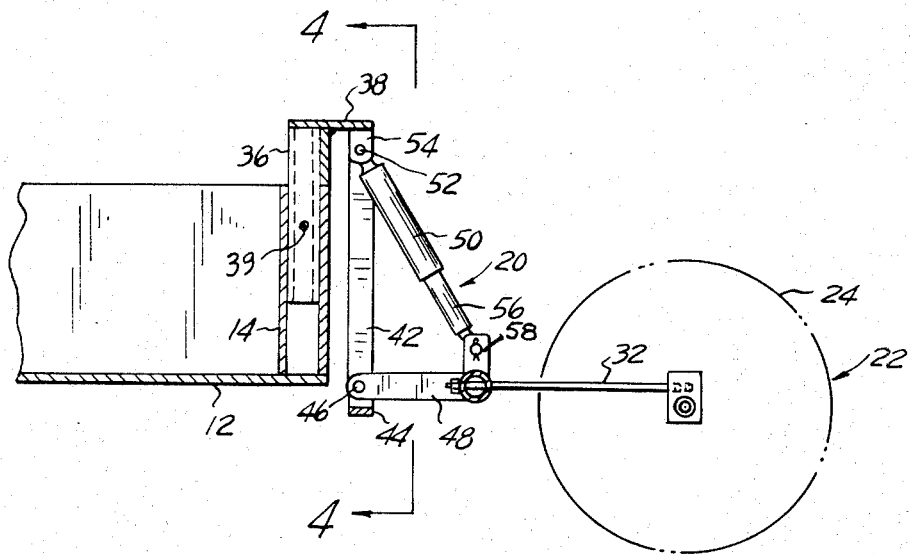
FIG. 3 is a cross-sectional view taken substantially on line 3—3 of FIG. 2.

A hitch assembly, generally indicated at 20, is utilized for attaching an implement 22, illustrated fully in FIG. 1 and in phantom in FIGS. 2 and 3, to the utility cart 10.

The implement 22 is illustrated for convenience as being similar to that shown in my aforementioned U.S. Pat. No. 3,650,331 and therefore comprises a plurality of substantially similar aerator units 24. It is to be understood, however, that other implements such as rollers or soil slicers could be used in place of the aerator units 24 illustrated. The aerator units 24, as described in my aforementioned patent, are arranged in a side by side relationship and each is carried on its own axle shaft 26.

Each of the aerator units 24 is adapted for independent rotary motion about its own axle shaft 26 and is further adapted for independent vertical movement with respect to the ground and adjacent aerator units 24 as the units traverse the ground. The aerator units 24 are each connected to a tubular, transverse draw bar 30 by a pair of flexible steel round bars 32 having one end fastened to the draw bar 30 to extend in cantilever fashion therefrom. The opposite end of the bars 32 carry bearing blocks 34 which receive the axle shafts 26. Draw arms 48 extend forwardly from the draw bar 30.

Figure 4:
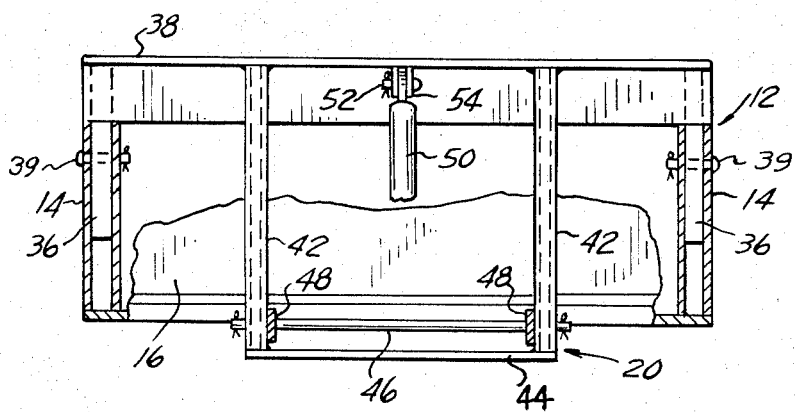
FIG. 4 is a cross-sectional view taken substantially on line 4—4 of FIG. 3.

The hitch assembly 20 preferably comprises a pair of downwardly extending leg members 36 which, as can best be seen in FIGS. 3 and 4, extend downwardly into the support members 14. Pins 39 extend through the support members 14 and through appropriate apertures provided in the leg members 36 to lock the leg members 36 in place. A horizontally extending support member 38 joins the upper ends of the leg members 36 together and provides the means for supporting a motor and pump unit 40 (FIG. 1). Frame members 42 are secured to the underside of the support member 38 and extend downwardly therefrom. The lower ends of the frame members 42 are joined by a flat support 44. The frame members 42 are provided with openings for receiving a rod 46 connected to the draw arms 48 of the implement 22.

A linear actuator in the form of a fluid cylinder 50 has one end pivotally connected as at 52 (FIG. 3) to the underside of the support member 38 by means of a bracket 54 and the rod end 56 pivotally connected through a bracket 58 to the draw bar 30. Thus, since the hitch assembly 20 is locked to the utility vehicle 10 by the pins 39, extension of the rod 56 of the cylinder 50 will produce a downward force on the draw bar 30 causing in effect a transfer of a portion of the weight of the utility vehicle 10 to the draw bar 30 and thus to the units 24 of the implement 22. As can best be seen in FIG. 1, the motor and pump unit 40 has a control rod 60 extending to the front of the vehicle 10 so that the amount of force exerted on the draw bar 30 and thus the weight transferred to the implement 22 can be conveniently controlled while operating the vehicle.

It is apparent that the present invention has provided a means for mounting a lightweight ground working implement and the like to a vehicle having no power take-off means of its own. The self-contained unit for transferring the weight of the vehicle to the implement provides for much more widespread use of the type of implements that I have previously disclosed.

It is also apparent that although I have described but a single embodiment of the present invention, many changes and modifications can be made therein without departing from the spirit of the invention or the scope of the appended claims.

I claim:

1. A hitch assembly for coupling a vehicle and a ground treating implement, said hitch comprising:
   a first frame member adapted to be fastened to the rear of said vehicle;
   a second frame member pivotally attached to said first frame member;
   means having one end attached to said first frame member and an opposite end attached to said implement and operable when actuated to exert a downward force on said implement to thereby pivot said implement about said pivotal attachment between said implement and said second frame to thereby transfer a portion of the weight of said vehicle to said implement;
   said last mentioned means comprising a fluid cylinder having one end pivotally fastened to said first frame member and a rod pivotally attached to said implement;
   a motor and a fluid pump carried by said hitch assembly for extending said fluid cylinder;
   a pair of spaced vertically extending hollow frame members "adapted to be attached to said vehicle," said first frame member of said hitch assembly includes leg members adapted to be received in said hollow frame members; and
   means for locking said leg members in said hollow frame members.

2. A hitch assembly for coupling a vehicle and a ground treating implement, said hitch comprising:
   a first frame member adapted to be fastened to the rear of said vehicle;
   a second frame member pivotally attached to said first frame member;
   means having one end attached to said first frame member and an opposite end attached to said implement and operable when actuated to exert a downward force on said implement to thereby pivot said implement about said pivotal attachment between said implement and said second frame to thereby transfer a portion of the weight of said vehicle to said implement;
   a pair of spaced vertically extending hollow frame members "adapted to be attached to said vehicle," said first frame member of said hitch assembly includes leg members received in said hollow frame members; and
   means for locking said leg members in said hollow frame members.

3. In combination with a vehicle, a hitch assembly for coupling the vehicle to a ground treating implement, said hitch comprising; a first frame member adapted to be fastened to the rear of said vehicle; a second frame member pivotally attached to said first frame member; means having one end attached to said first frame member and an opposite end attached to said implement and operable when actuated to exert a downward force on said implement to thereby pivot said implement about said pivotal attachment between said implement and said second frame to thereby transfer a portion of the weight of said vehicle to said implement; said last mentioned means comprising a fluid cylinder having one end pivotally fastened to said first frame member and a rod pivotally attached to said implement; a motor and a fluid pump carried by said hitch assembly for extending said fluid cylinder;
   said vehicle being provided with a pair of spaced vertically extending hollow frame members and said first frame member of said hitch assembly including leg members received in said hollow frame members, and means for locking said leg members in said hollow frame members.

* * * * *

UNITED STATES PATENT OFFICE
CERTIFICATE OF CORRECTION

Patent No. 3,756,203    Dated September 4, 1973

Inventor(s) Arnold A. Dedoes

It is certified that error appears in the above-identified patent and that said Letters Patent are hereby corrected as shown below:

Col. 1, line 8, delete "2,643,746" and insert --3,643,746--.

Col. 2, line 5, delete "cart" and insert --vehicle-- (two occurrences).

line 60, after "54", insert --(FIG. 3)--.

Col. 3, line 40, delete quotation marks around "adapted to be attached to said vehicle,";

Col. 4, line 15, delete quotation marks.

Signed and sealed this 12th day of February 1974.

(SEAL)
Attest:

EDWARD M. FLETCHER, JR.
Attesting Officer

C. MARSHALL DANN
Commissioner of Patents